(12) United States Patent
Spath

(10) Patent No.: US 11,125,493 B2
(45) Date of Patent: Sep. 21, 2021

(54) METHOD AND SYSTEM FOR CONTROLLING USE OF A PORTABLE COOLING CONTAINER

(71) Applicant: CARRIER CORPORATION, Jupiter, FL (US)

(72) Inventor: Anthony J. Spath, West Hartford, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 277 days.

(21) Appl. No.: 16/272,275

(22) Filed: Feb. 11, 2019

(65) Prior Publication Data

US 2019/0277561 A1 Sep. 12, 2019

Related U.S. Application Data

(60) Provisional application No. 62/639,529, filed on Mar. 7, 2018.

(51) Int. Cl.
*F25D 11/00* (2006.01)
*F25D 29/00* (2006.01)
(Continued)

(52) U.S. Cl.
CPC ........... *F25D 31/006* (2013.01); *B65D 81/18* (2013.01); *F25D 11/003* (2013.01); *F25D 23/08* (2013.01);
(Continued)

(58) Field of Classification Search
CPC .. F25D 11/003; F25D 29/003; F25D 2400/12; F25D 2400/32; F25D 2500/04;
(Continued)

(56) References Cited

U.S. PATENT DOCUMENTS 4,301,658 A * 11/1981 Reed ....................... F25B 21/04
165/253
5,838,227 A 11/1998 Murray
(Continued)

FOREIGN PATENT DOCUMENTS

CN 202339059 * 7/2012 ............. F25D 11/02
CN 204359047 U 5/2015
(Continued)

OTHER PUBLICATIONS

Extended European Search Report for Application No. EP 19 16 1145 dated Jul. 17, 2019.

*Primary Examiner* — Frantz F Jules
*Assistant Examiner* — Daniel C Comings
(74) *Attorney, Agent, or Firm* — Carlson, Gaskey & Olds

(57) ABSTRACT

An illustrative example method of controlling use of a portable cooling container includes determining at least one characteristic of an amount of use of the cooling container. The at least one characteristic is determined by at least one of a processor at a location remote from the cooling container and a container controller of the cooling container. A relationship between the at least one characteristic and continued use of the cooling container is determined. An indication to a user of the cooling container is provided regarding continued use of the cooling container based on the determined relationship.

20 Claims, 3 Drawing Sheets

(51) Int. Cl.
- G06Q 30/06 (2012.01)
- F25D 31/00 (2006.01)
- B65D 81/18 (2006.01)
- F25D 23/08 (2006.01)
- G06Q 50/30 (2012.01)
- G06Q 50/28 (2012.01)
- G06Q 50/02 (2012.01)

(52) U.S. Cl.
CPC ...... *F25D 29/003* (2013.01); *F25D 2331/804* (2013.01); *F25D 2400/12* (2013.01); *F25D 2400/32* (2013.01); *F25D 2400/34* (2013.01); *F25D 2400/361* (2013.01); *F25D 2500/04* (2013.01); *G06Q 30/0645* (2013.01); *G06Q 50/02* (2013.01); *G06Q 50/28* (2013.01); *G06Q 50/30* (2013.01)

(58) Field of Classification Search
CPC ............... F25D 2600/02; F25D 31/006; F25D 2331/804; F25D 2400/34; F25D 2400/361; B65D 81/18
See application file for complete search history.

(56) References Cited

U.S. PATENT DOCUMENTS

| | | |
|---|---|---|
| 6,195,648 B1 | 2/2001 | Simon et al. |
| 6,476,763 B2 | 11/2002 | Allen, Jr. |
| 6,542,076 B1 | 4/2003 | Joao |
| 6,647,328 B2 | 11/2003 | Walker |
| 6,679,071 B1 | 1/2004 | Storey et al. |
| 6,863,222 B2 | 3/2005 | Slifkin et al. |
| 7,092,803 B2 | 8/2006 | Kapolka et al. |
| 7,359,773 B2 | 4/2008 | Simon et al. |
| 7,673,466 B2 | 3/2010 | Pacy |
| 8,022,573 B2 | 9/2011 | Powers et al. |
| 8,295,950 B1 | 10/2012 | Wordsworth et al. |
| 8,374,824 B2 | 2/2013 | Schwiers et al. |
| 8,437,886 B1 | 5/2013 | Yang |
| 8,461,958 B2 | 6/2013 | Saenz et al. |
| 8,538,608 B2 | 9/2013 | Meltser et al. |
| 8,960,563 B1 | 2/2015 | Perten et al. |
| 9,026,267 B2 | 5/2015 | Schwarz et al. |
| 9,031,874 B2 | 5/2015 | Kremen |
| 9,183,530 B2 | 11/2015 | Schwarz et al. |
| 9,310,279 B2 | 4/2016 | Crombie et al. |
| 9,586,458 B2 | 3/2017 | Larson et al. |
| 9,587,878 B2 * | 3/2017 | Paydar .................... F25D 29/00 |
| 2007/0236357 A1 | 10/2007 | Glielmo et al. |
| 2013/0298575 A1 | 11/2013 | Stark et al. |
| 2014/0026599 A1 | 1/2014 | Rusignuolo et al. |
| 2015/0120597 A1 * | 4/2015 | Dertadian ................ G01K 3/04 |
| | | 705/332 |
| 2015/0188360 A1 | 7/2015 | Doane et al. |
| 2016/0090923 A1 | 3/2016 | Al Salah |
| 2016/0252296 A1 | 9/2016 | Ros |
| 2016/0339870 A1 | 11/2016 | Morgan et al. |

FOREIGN PATENT DOCUMENTS

| | | |
|---|---|---|
| CN | 106940119 A | 7/2017 |
| EP | 2 711 655 A2 | 3/2014 |
| WO | 2016/181223 A2 | 11/2016 |
| WO | 2016/187495 A1 | 11/2016 |

* cited by examiner

METHOD AND SYSTEM FOR CONTROLLING USE OF A PORTABLE COOLING CONTAINER

CROSS REFERENCE TO RELATED APPLICATIONS

This application claims priority to U.S. Provisional Application No. 62/639,529, which was filed on Mar. 7, 2018.

BACKGROUND

A variety of systems are known for transporting items in a temperature-controlled environment. For example, refrigerated trucks have on-board refrigeration systems that facilitate keeping the cargo portion of the truck cooled to a desired temperature for transporting perishable goods. Other transport refrigeration systems are associated with trailers or railway cars. While such systems have proven useful, there are limitations on their use. The so-called last mile of transportation may involve removing the goods from the temperature controlled cargo compartment and transporting them in an insulated container or cooling them using dry ice.

More recently, smaller-scale, portable cooling devices have been proposed that include a thermoelectric device. Such devices may be useful for last mile transportation of perishable goods, however, new techniques for controlling the use or operation of such devices are needed to address different use scenarios.

SUMMARY

An illustrative example method of controlling use of a portable cooling container includes determining at least one characteristic of an amount of use of the cooling container. The at least one characteristic is determined by at least one of a processor at a location remote from the cooling container and a container controller of the cooling container. A relationship between the at least one characteristic and continued use of the cooling container is determined. An indication to a user of the cooling container is provided regarding continued use of the cooling container based on the determined relationship.

In an example embodiment having one or more features of the method of the previous paragraph, determining the at least one characteristic includes determining an expected use time for the cooling container within a selected window of time and determining a remaining amount of the expected use time.

In an example embodiment having one or more features of the method of any of the previous paragraphs, providing the indication comprises determining a currently used power source for powering the cooling container, determining whether the currently used power source is expected to provide sufficient power for the cooling container for the remaining amount of the expected use time, and providing the indication to the user including information regarding switching to another power source when the currently used power source is not expected to provide sufficient power.

In an example embodiment having one or more features of the method of any of the previous paragraphs, providing the indication includes determining a cost estimate for using at least one other power source for at least some of the remaining amount of the expected use time, and providing an indication of the cost estimate to the user.

In an example embodiment having one or more features of the method of any of the previous paragraphs, providing the indication includes determining a remaining power available from the currently used power source, and providing an indication of at least one of the remaining power available and an expected time when the currently used power source will not have sufficient remaining power available to power the cooling container.

In an example embodiment having one or more features of the method of any of the previous paragraphs, the selected window of time comprises at least one day, and the expected use time comprises a number of hours within the at least one day.

In an example embodiment having one or more features of the method of any of the previous paragraphs, determining the at least one characteristic includes determining an amount of authorized use time the cooling container has been in use, and determining whether the amount of authorized use time is within a predetermined range of a maximum allowable time for authorized use.

In an example embodiment having one or more features of the method of any of the previous paragraphs, providing the indication includes providing a warning to the user regarding a time when the cooling container will no longer be authorized for use when the amount of authorized use time is within the predetermined range of the maximum allowable time for authorized use.

In an example embodiment having one or more features of the method of any of the previous paragraphs, providing the indication includes providing information to the user regarding at least one option to extend the time the cooling container is authorized for use.

An example embodiment having one or more features of the method of any of the previous paragraphs includes automatically disabling the cooling container when the maximum allowable time expires.

An illustrative system for controlling use of a portable cooling container includes a user interface and a container controller that is configured to determine at least one characteristic of an amount of use of the cooling container. The container controller is also configured to provide an indication regarding continued use of the cooling container based on a determined relationship between the at least one characteristic of the amount of use and continued use of the cooling container. The user interface is configured to provide the indication regarding continued use.

An example embodiment having one or more features of the system of the previous paragraph includes a transceiver associated with the cooling container and a processor that receives a communication from the transceiver indicating the at least one characteristic determined by the container controller. The processor is located remotely from the cooling container and is configured to determine the relationship between the at least one characteristic and continued use of the cooling container. The processor is configured to provide a communication to the transceiver including the indication regarding continued use of the cooling container.

In an example embodiment having one or more features of the system of either of the previous paragraphs, the at least one characteristic comprises an expected use time for the cooling container within a selected window of time and a remaining amount of the expected use time. The processor is configured to determine a currently used power source for powering the cooling container and to determine whether the currently used power source is expected to provide sufficient power for the cooling container for the remaining amount of the expected use time. The indication includes information regarding switching to another power source when the currently used power source is not expected to provide sufficient power.

In an example embodiment having one or more features of the system of any of the previous paragraphs, the processor is configured to determine a cost estimate for using at least one other power source for at least some of the remaining amount of the expected use time, and the communication received by the transceiver includes information regarding the cost estimate.

In an example embodiment having one or more features of the system of any of the previous paragraphs, the controller is configured to determine a remaining power available from the currently used power source, and the indication includes an indication of at least one of the remaining power available and an expected time when the currently used power source will not have sufficient remaining power available to power the cooling container.

In an example embodiment having one or more features of the system of any of the previous paragraphs, the selected window of time comprises at least one day, and the expected use time comprises a number of hours within the at least one day.

In an example embodiment having one or more features of the system of any of the previous paragraphs, the processor is configured to determine an amount of authorized use time the cooling container has been in use, and to determine whether the amount of authorized use time is within a predetermined range of a maximum allowable time for authorized use.

In an example embodiment having one or more features of the system of any of the previous paragraphs, the processor is configured to provide information corresponding to a warning regarding a time when the cooling container will no longer be authorized for use when the amount of authorized use time is within the predetermined range of the maximum allowable time for authorized use.

In an example embodiment having one or more features of the system of any of the previous paragraphs, the processor is configured to provide information regarding at least one option to extend the time the cooling container is authorized for use.

In an example embodiment having one or more features of the system of any of the previous paragraphs, the cooling controller is configured to disable the cooling container when the maximum allowable time expires.

Various features and advantages of at least one disclosed example embodiment will become apparent to those skilled in the art from the following detailed description. The drawings that accompany the detailed description can be briefly described as follows.

DETAILED DESCRIPTION

Embodiments of this invention include the ability to control use of a portable cooling container based on a characteristic of an amount of use of that container. Such control may include or involve communications between the cooling container or a user of the cooling container and a remotely located entity.

Figure 1:
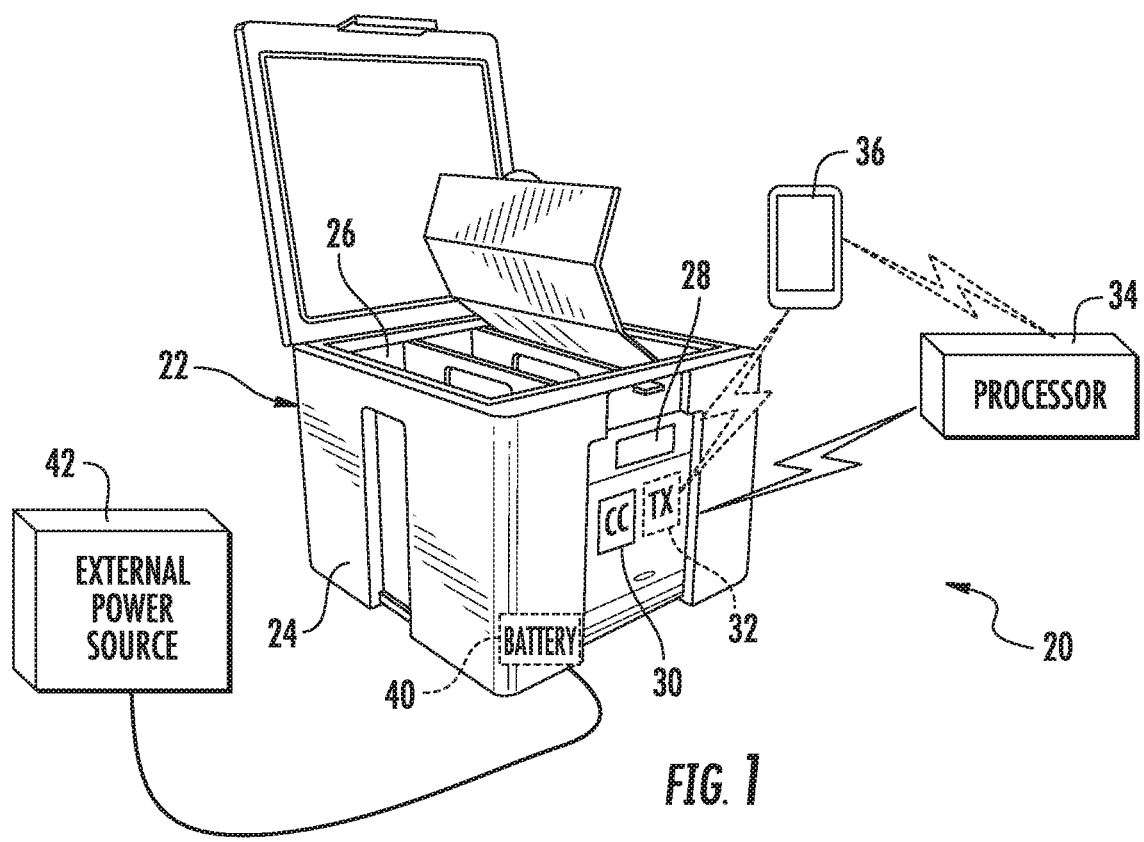
FIG. 1 schematically illustrates a system for controlling operation of a portable cooling container.

FIG. 1 diagrammatically illustrates an example system 20 for controlling operation or use of a portable cooling container 22. In this example, the portable cooling container 22 includes a housing 24 that is selectively open to provide access to an interior cavity 26 where perishable goods, for example, may be placed to be maintained at a desired temperature during transportation or storage. A user interface 28 provides information to a user of the portable cooling container 22 through a visual display, an audible output, or both.

A container controller 30 is configured to control operation of the cooling container 22. The controller 30 includes a processor and associated memory. In the illustrated example the container controller 30 is configured through programming (e.g., software, firmware or both) to perform the functions explained in this description.

A transceiver 32 facilitates communications between the container controller 30 and remotely located devices, such as a processor 34, which may be used by a supplier of containers such as the cooling container 22 or an owner of a fleet or collection of cooling containers, to remotely control operation or use of such containers. The processor 34 may be owned or operated by a shipping company that utilizes multiple cooling containers 22 in various locations to allow for centralized control over continued use of such containers.

In the illustrated example, the transceiver 32 is also configured for communicating with a mobile device 36, which may be used by an owner or user of the container 22 for controlling operation or use of the container 22. The mobile device 36 may also be used for communicating with the remotely located processor 34. For example, if the cooling container 22 is maintained in a trailer portion of a vehicle, an individual in the cabin of the vehicle may use the mobile station 36 for purposes of communicating through the transceiver 32 with the container controller 30 for purposes of maintaining or altering operation of the cooling container 22. In some embodiments the mobile device 36 is configured to be a user interface associated with the cooling container 22.

The illustrated example cooling container 22 includes an on-board or internal power source 40, such as a battery. In this example, the container 22 is also capable of being powered through an external power source 42. Example external power sources 42 include a battery on-board a vehicle, an electrical power outlet, a solar power source, an external generator, or a source of power that operates based on exhaust energy from a vehicle having an internal combustion engine.

Figure 2:
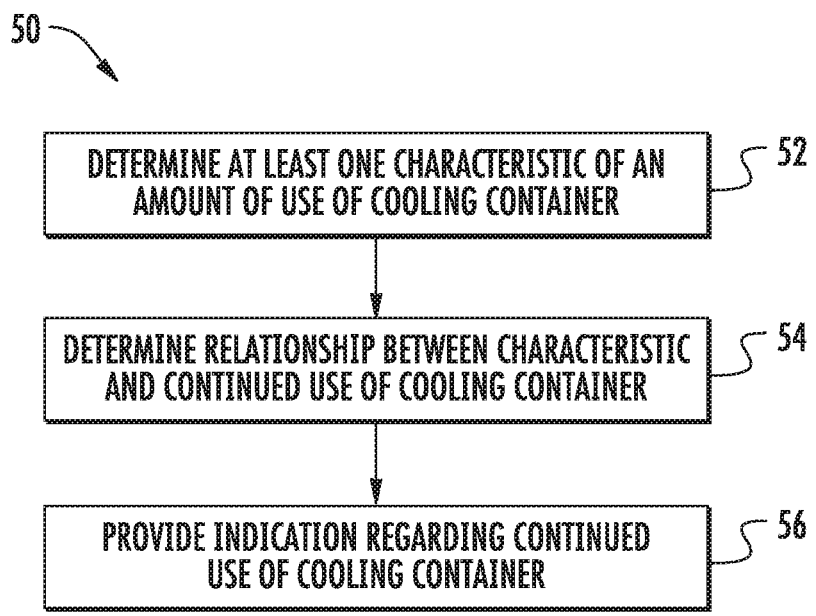
FIG. 2 is a flowchart diagram summarizing an example method of controlling operation of a portable cooling container.

The system 20 provides the ability to control operation of the cooling container 22 based on an amount of use of the container 22. A flowchart diagram 50 in FIG. 2 summarizes an example approach. At 52, a determination is made regarding at least one characteristic of an amount of use of the cooling container 22. In some examples, the container controller 30 determines the characteristic while in other examples, the processor 34 determines the characteristic. At 54, a relationship between the determined characteristic and continued use of the cooling container is determined. In the illustrated example, the container controller 30 or the processor 34 determines this relationship. At 56, an indication is provided regarding continued use of the cooling container 22. The indication may be provided to a user or owner of the cooling container 22. The indication may be provided on the user interface 28 or the mobile device 36, for example. In some embodiments, the indication is visible, audible or a combination of these.

Figure 3:
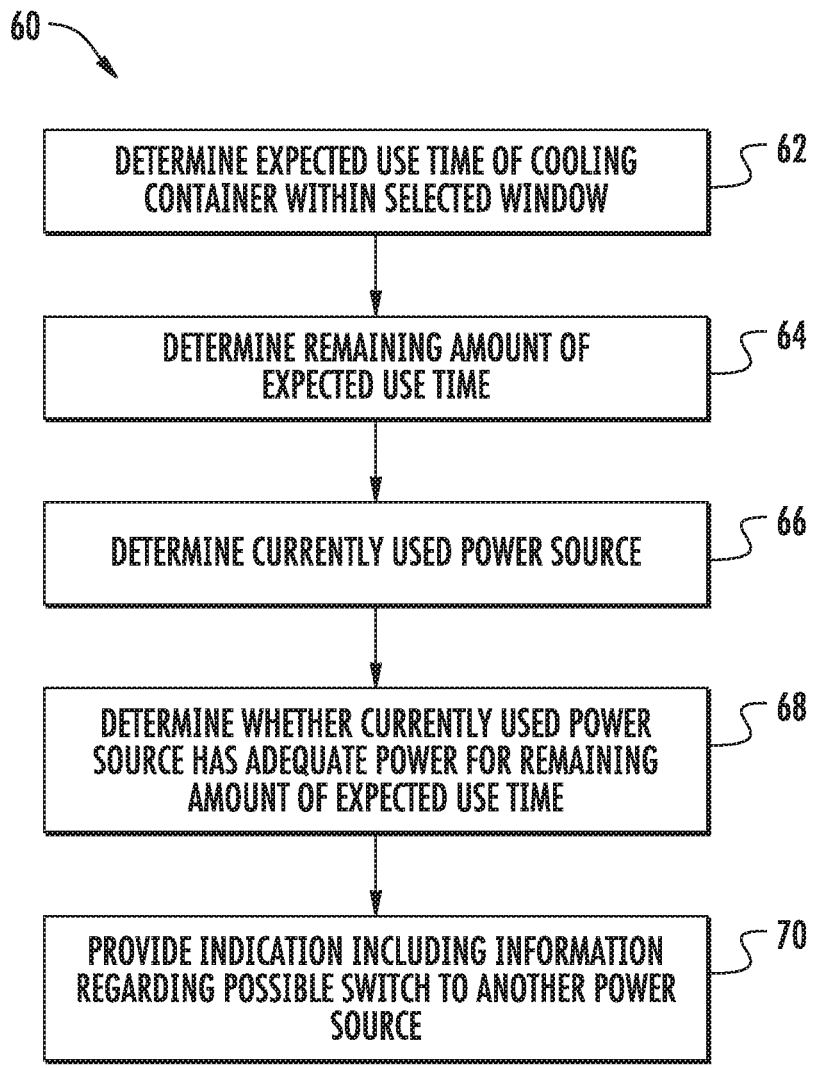
FIG. 3 is a flowchart diagram summarizing selected features of a method consistent with the flowchart diagram of FIG. 2.

FIG. 3 includes a flowchart diagram 60 showing more detail of an example use of the technique of the flowchart diagram 50. In this example, the amount of use of the cooling container 22 is useful for controlling the delivery of power for operating the cooling container 22, such as selecting a power source to provide power to the cooling container 22.

In the example of FIG. 3, the determined characteristic of the amount of use is an expected use time of the cooling container 22 within a selected window of time, which is determined at 62. For example, the expected use time may be a scheduled amount of cooling time for a particular transportation cycle or work day. The cooling container 22 may be expected to be operational to provide cooling for perishable contents, for example, for a scheduled number of hours during a day. Such information may be provided by a user through the user interface 28 or the mobile device 36, for example, such that the container controller 30 has information pertaining to the expected use time.

In the illustrated example, the container controller 30 has a timer or clock function that allows the container controller 30 to determine the remaining amount of expected use time at 64. For example, if the container is expected to be used for transporting goods over a period of six hours, the container controller 30 may determine how many of those hours have already passed since the container 22 was turned on or loaded with perishable contents. The expected use time information is communicated through the transceiver 32 to the processor 34 in some embodiments.

At 66, a determination is made regarding which power source is currently used for powering the cooling container 22. This information may be automatically determined by the container controller 30 or may be provided by a user of the container 22. In the illustrated example, the container controller 30 or the processor 34 determines whether the currently used power source has adequate power for the remaining amount of expected use time at 68. In embodiments which include the processor 34 making the determination regarding adequate power, the processor 34 includes an indication of this determination in a communication to the transceiver 32. The container controller 30 processes the indication from such a communication in such embodiments. In other embodiments, the indication is provided to the owner or user of the cooling container 22 through the mobile device 36, which may receive the indication from the transceiver 32 or directly from the processor 34.

At 70, an indication is provided to a user including information regarding a possible switch to another power source from the currently used power source. For example, when the battery 40 is being used for powering the cooling container 22 and the determination at 66 indicates that the battery 40 may not have sufficient charge to maintain adequate cooling for the remaining amount of the expected use time, the indication provided at 70 indicates that it would be desirable to switch over to the external power source 42. This indication may be provided to the container controller 30, a user or owner of the controller 22, or both. In some example embodiments, the user responds to the indication by causing the switch to the alternative power source when the user deems it appropriate. Under such circumstances, the user may use the mobile device 36 or user interface 28 to indicate the desired change. In other example embodiments, the container controller 30 automatically controls which of the power sources will be used and automatically accomplishes a switch between power sources when necessary.

In some example embodiments, the processor 34 is configured to provide comparative information regarding cost if the external power source 42 would be used for any portion of the expected use time. For example, the processor 34 may have access to information regarding fuel costs in a region where the cooling container 22 is in use. In the event that the external power source 42 requires such fuel, the cost estimate would be based on the price of fuel in that region.

The methodology summarized in FIG. 3 allows for increasing the efficiency of power consumption by one or more cooling containers 22 over time. In situations where multiple containers are used for different goods over different periods of time, different power source selection for the respective containers allows for controlling each individually to maximize the battery life or cost efficiency of any number of cooling containers. The power source selection may be accomplished from the remote location of the processor 34. Additionally, the example technique facilitates insuring that adequate cooling power is available to keep the contents of the container 22 at a desired temperature throughout a scheduled time of use.

Figure 4:
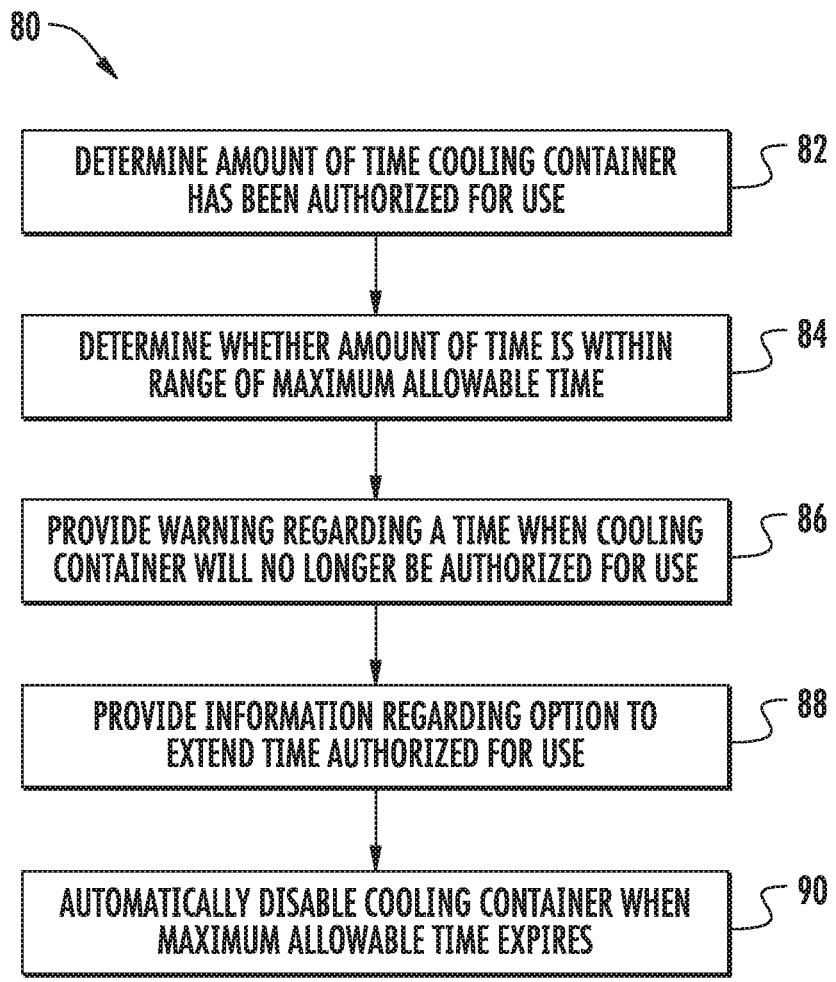
FIG. 4 is a flowchart diagram summarizing selected features of a method consistent with the flowchart diagram of FIG. 2.

FIG. 4 includes a flowchart diagram 80 that summarizes how the method shown at 50 in FIG. 2 may be used for controlling the useful life of the cooling container 22. In some situations, the cooling container 22 will be purchased or leased for use during an authorized period of time, which may extend over several months or years. The container controller 30 or the processor 34 receives information regarding an authentication process that sets the boundaries on the authorized use time for the container 22.

At 82, the processor 34 or the container controller 30 determines the amount of authorized use time the cooling container 22 has been in use. In the event that the container controller 30 makes the determination at 82, such information is provided through the transceiver 32 to the processor 34.

At 84, the processor 34 determines whether the amount of authorized use time that the cooling container 22 has been in use is within a selected range of a maximum allowable time. For example, if the container 22 was authorized for use over a period of three months, the range may be set at one week so that once the container 22 has been used for two months and three weeks, the determined amount of authorized use time is within that range.

At 86, an indication or warning is provided regarding a time when the cooling container 22 will no longer be authorized for use. This may be accomplished by providing a visual or audible indication on the user interface 28, the mobile device 36, or both. The warning or indication may include information such as the time when the authorized use will expire so that the user or owner of the container 22 will not be surprised if the container stops to provide cooling when it was being used to transport or store perishable contents.

In the example of FIG. 4, information is provided at 88 regarding an option to extend the time for authorized use. For example, the owner or user of the container 22 may receive information for how to extend a contract or purchase additional time during which the container 22 will be authorized for use. If that option is not exercised and the maximum allowable time is reached, the container controller 30 automatically disables the cooling container 22 when the maximum allowable time expires as shown at 90 in FIG. 4. The container controller 30 in such examples responds to a communication from the processor 34 received by the transceiver 32 indicating that the on-board cooling apparatus should be disabled or disconnected from all power sources.

One aspect of the methodology of FIG. 4 is that it allows a supplier of cooling containers 22 to maintain control over how long cooling units remain in service along with providing control over any secondary market for such cooling containers. Additionally, the technique summarized in FIG. 4 prevents a user or owner of the container 22 from being surprised when the container 22 becomes no longer usable because the authorized time for use has expired.

In some example embodiments, the remote processor 34 is not required and the container controller 30 makes all of the determinations regarding the characteristic of the amount of use, the relationship between that characteristic and continued use, and provides the indication without communications with a remote processor, such as the processor 34. In such embodiments, the transceiver 32 facilitates communications with a hand-held user device, such as the mobile station or phone 36 to allow an individual to receive the indication regarding continued use of the cooling container 22.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A method of controlling use of a portable cooling container, the method comprising:
    using a container controller on the portable cooling container for controlling a thermoelectric device of the portable cooling container to maintain a selected temperature within the portable cooling container;
    determining at least one characteristic of an amount of use of the cooling container by determining an expected use time for the cooling container within a selected window of time and determining a remaining amount of the expected use time, wherein the at least one characteristic is determined by at least one of a processor at a location remote from the cooling container and the container controller of the cooling container;
    determining a relationship between the at least one characteristic and continued use of the cooling container, wherein the relationship is determined by at least one of the processor at the location remote from the cooling container and the container controller of the cooling container; and
    providing an indication to a user of the cooling container regarding continued use of the cooling container based on the determined relationship by
        determining a currently used power source for powering the cooling container,
        determining whether the currently used power source is expected to provide sufficient power for the cooling container for the remaining amount of the expected use time,
        providing the indication to the user including information regarding switching to another power source when the currently used power source is not expected to provide the sufficient power,
        determining a cost estimate for using at least one other power source for at least some of the remaining amount of the expected use time, and
        providing an indication of the cost estimate to the user.

2. The method of claim 1, wherein providing the indication comprises
    determining a remaining power available from the currently used power source; and
    providing an indication of at least one of the remaining power available and an expected time when the currently used power source will not have sufficient remaining power available to power the cooling container.

3. The method of claim 1, wherein
    the selected window of time comprises at least one day; and
    the expected use time comprises a number of hours within the at least one day.

4. The method of claim 1, wherein determining the at least one characteristic comprises
    determining an amount of authorized use time the cooling container has been in use; and
    determining whether the amount of authorized use time is within a predetermined range of a maximum allowable time for authorized use.

5. The method of claim 4, wherein providing the indication comprises
    providing a warning to the user regarding a time when the cooling container will no longer be authorized for use when the amount of authorized use time is within the predetermined range of the maximum allowable time for authorized use.

6. The method of claim 5, wherein providing the indication comprises
    providing information to the user regarding at least one option to extend the time the cooling container is authorized for use.

7. The method of claim 4, comprising automatically disabling the cooling container when the maximum allowable time expires.

8. A system for controlling use of a portable cooling container, the system comprising:
    a container controller that is configured to determine at least one characteristic of an amount of use of the cooling container, wherein the container controller is configured to provide an indication regarding continued use of the cooling container based on a determined relationship between the at least one characteristic and the continued use;
    a user interface configured to provide the indication regarding continued use;
    a transceiver associated with the container controller; and
    a processor that receives a communication from the transceiver indicating the at least one characteristic determined by the container controller, the processor being located remotely from the cooling container, the processor being configured to determine the relationship between the at least one characteristic and continued use of the cooling container, the processor being configured to provide a communication to the transceiver including the indication regarding continued use of the cooling container,
    wherein
    the at least one characteristic comprises an expected use time for the cooling container within a selected window of time and a remaining amount of the expected use time;
    the processor is configured to
        determine a currently used power source for powering the cooling container, and determine whether the currently used power source is expected to provide sufficient power for the cooling container for the remaining amount of the expected use time; and the indication includes information regarding switching to another power source when the currently used power source is not expected to provide the sufficient power;

the processor is configured to determine a cost estimate for using at least one other power source for at least some of the remaining amount of the expected use time; and the communication provided to the transceiver includes information regarding the cost estimate.

9. The system of claim 8, wherein the controller is configured to determine a remaining power available from the currently used power source; and the indication includes an indication of at least one of the remaining power available and an expected time when the currently used power source will not have sufficient remaining power available to power the cooling container.

10. The system of claim 8, wherein the selected window of time comprises at least one day; and the expected use time comprises a number of hours within the at least one day.

11. The system of claim 8, wherein processor is configured to determine an amount of authorized use time the cooling container has been in use; and determine whether the amount of authorized use time is within a predetermined range of a maximum allowable time for authorized use.

12. The system of claim 11, wherein the processor is configured to provide information corresponding to a warning regarding a time when the cooling container will no longer be authorized for use when the amount of authorized use time is within the predetermined range of the maximum allowable time for authorized use.

13. The system of claim 12, wherein the processor is configured to provide information regarding at least one option to extend the time the cooling container is authorized for use.

14. The system of claim 11, wherein the cooling controller is configured to disable the cooling container when the maximum allowable time expires.

15. A portable cooling container, comprising
a housing configured to contain at least one perishable item during last mile transportation of the item;
a thermoelectric device supported by the housing;
a portable power source supported by the housing, the portable power source providing power to the thermoelectric device;
a container controller supported by the housing, the container controller controlling operation of the thermoelectric device to maintain a selected temperature within the portable cooling container, the container controller determining
an expected use time within a transportation cycle that the selected temperature is required within the portable cooling container,
a remaining amount of the expected use time within the transportation cycle,
whether the portable power source is expected to provide sufficient power for the thermoelectric device to maintain the selected temperature in the portable cooling container for the remaining amount of the expected use time, and the container controller providing an indication regarding switching to another power source when the portable power source is not expected to provide the sufficient power.

16. The portable cooling container of claim 15, comprising a user interface configured to provide at least one of a visible or an audible output corresponding to the indication.

17. The portable cooling container of claim 15, comprising a transceiver associated with the container controller, wherein the transceiver communicates the indication to at least one device that is separate from the housing.

18. The portable cooling container of claim 17, wherein the container controller determines a cost estimate for using at least one other power source for at least some of the remaining amount of the expected use time, and the transceiver includes information regarding the cost estimate when the transceiver communicates the indication to the at least one device separate from the housing.

19. The portable cooling container of claim 15, wherein the container controller determines an amount of authorized use time the cooling container has been in use, determines whether the amount of authorized use time is within a predetermined range of a maximum allowable time for authorized use, and provides information corresponding to a warning regarding a time when the cooling container will no longer be authorized for use when the amount of authorized use time is within the predetermined range of the maximum allowable time for authorized use.

20. The portable cooling container of claim 19, wherein the container controller provides information regarding at least one option to extend the time the cooling container is authorized for use; and, disables the cooling container when the maximum allowable time expires.

* * * * *